United States Patent [19]

Cogelia et al.

[11] Patent Number: 4,761,053
[45] Date of Patent: Aug. 2, 1988

[54] COMMUNICATIONS TRANSMISSION MEDIA

[75] Inventors: Nicholas J. Cogelia, Duluth; Brian D. Johnson, Norcross; William C. Reed, Lilburn; Carla G. Wilson, Decatur, all of Ga.

[73] Assignees: American Telephone and Telegraph Company, AT&T Bell Laboratories, Murray Hill; AT&T Technologies, Inc., Berkeley Heights, both of N.J.

[21] Appl. No.: 45,749

[22] Filed: Apr. 28, 1987

Related U.S. Application Data

[63] Continuation-in-part of Ser. No. 770,041, Aug. 28, 1985, abandoned.

[51] Int. Cl.⁴ .................. G02B 6/44; H01B 7/08; H01B 11/02
[52] U.S. Cl. .................. 350/96.23; 174/41; 174/70 A; 174/115; 174/117 F; 428/379; 428/383
[58] Field of Search ........... 428/379, 392, 383, 375; 350/96.23; 65/4; 174/70 R, 70 A, 115, 41, 117 F, 120 SR

[56] References Cited

U.S. PATENT DOCUMENTS

| 2,628,998 | 2/1953 | Frisbie | 174/112 |
|---|---|---|---|
| 2,663,755 | 12/1955 | McBride | 174/117 |
| 2,950,338 | 8/1960 | Taylor | 174/40 |
| 3,060,260 | 10/1962 | Scofiled | 174/117 |
| 3,328,514 | 6/1967 | Cogelia | 174/113 |
| 3,458,650 | 7/1969 | Miyawaki et al. | 174/117 |
| 3,549,788 | 12/1970 | Apen | 174/115 |
| 3,887,265 | 6/1975 | Margolis et al. | 350/96.23 |
| 3,927,248 | 12/1975 | Scholl et al. | 174/41 |
| 3,935,369 | 1/1976 | George et al. | 428/379 |
| 3,983,313 | 9/1976 | Ney et al. | 174/121 SR |
| 4,081,602 | 3/1978 | Paniri et al. | 174/103 |
| 4,089,585 | 5/1978 | Slaughter et al. | 350/96.23 |
| 4,199,225 | 4/1980 | Slaughter | 350/96.23 |
| 4,220,812 | 9/1980 | Ney et al. | 174/117 F |
| 4,269,024 | 5/1981 | Ashpole et al. | 57/234 X |
| 4,317,000 | 2/1982 | Ferer | 350/96.23 X |
| 4,420,220 | 12/1983 | Dean et al. | 350/96.23 |
| 4,467,138 | 8/1984 | Brorein | 350/96.23 |
| 4,479,984 | 10/1984 | Levy et al. | 427/54.1 |

FOREIGN PATENT DOCUMENTS

481628 3/1952 Canada .
414713 8/1934 United Kingdom .

OTHER PUBLICATIONS

Okonite Bulletin ABW-5, Feb. 1985.

*Primary Examiner*—Lorraine T. Kendell
*Attorney, Agent, or Firm*—Edward W. Somers

[57] ABSTRACT

An aerial service wire (20) includes a jacket (40) having a generally rectangularly shaped cross section and comprising a polyvinyl chloride plastic material. Enclosed by the jacket are two strength members (36—36) each of which includes a plurality of filaments and each of which is impregnated with a material which is compatable with that of the jacket. The strength members are disposed along an axis (42) of the cross section which passes through a geometric center through which a longitudinal axis (50) of the jacket passes. Conductors (30—30) which are individually insulated are disposed adjacent to the longitudinal axis with each strength member being disposed between the conductors and the outer surface of the jacket.

14 Claims, 7 Drawing Sheets

COMMUNICATIONS TRANSMISSION MEDIA

This application is a continuation-in-part of application Ser. No. 770,041 filed Aug. 28, 1985 now abandoned.

TECHNICAL FIELD

This invention relates to communications transmission media. More particularly, it relates to an aerial service transmission medium which includes solid metallic or optical fiber conductors and non-metallic strength members.

BACKGROUND

Aerial service wire which has been referred to as drop wire extends the communications loop from distribution cable terminals to customers' premises. Typically, telephone aerial service wire comprises two parallel spaced metallic conductors. The metallic conductors not only provide transmission paths, but also they provide strength for aerial installations.

In one prior art aerial service wire, it was customary to include two electroformed copper-clad steel conductors enclosed with an extruded rubber insulation covered by a textile serving, and jacketed with a rubber-like material. Although such protective coverings were in widespread use for many years and had proven satisfactory from most standpoints, there developed a long felt desire for an alternative, less expensive covering. Any alternative covering had to have the capability of withstanding exposure to the elements, as well as adequate low temperature flexibility, impact resistance, and abrasion resistance.

A substantially improved plastic covered aerial service wire is disclosed in U.S. Pat. No. 3,935,369 issued on Jan. 27, 1976 to E. J. George, et al and includes two copper-clad steel conductors enclosed in insulation comprising a plasticized polyvinyl chloride (PVC) composition. The insulation serves also as a jacket. In addition to being more economical, this last described aerial service wire is lighter, more abrasion-resistant and easier to handle and terminate than its predecessor.

In a typical installation, each end portion of the aerial service wire is inserted into a metallic clamp. One of the clamps is attached to a customer's premises and the other one to a pole prior to electrical connections being made to wiring inside the customer's premises and to aerial distribution cables, respectively. At both the customer and the pole end of the aerial service wire, the wire is retained in engagement with the clamp by reactive forces exerted by the clamp on the insulation. If these forces are not transferred from the insulation to the conductors by coupling therebetween, the conductors will slip relative to the insulation within the clamp causing the insulation to rupture and, in some instances, the wire to fall. Adhesion of the plastic material to the metallic conductors may provide suitable coupling.

On the other hand, if the adhesion between the insulation and the conductors is too great, stripping the covering from the conductors may be difficult. Excessive scraping causes some of the copper from the surface portion of the copper-clad steel conductor to be removed thereby increasing the electrical resistance of the conductor termination. Excessive scraping also reduces the cross-sectional area of the conductor or nicks it thereby reducing its strength properties to the detriment of its load-supporting capability. Also, scraping may expose the steel, promoting corrosion of the bimetallic conductor.

Although present aerial service wires are adequate, a new, less expensive design has been sought. Environmental requirements for the disposal of residual copper and processing chemicals have raised the cost of manufacturing copper-clad conductors. Also, these conductors, on occasion, have displayed another problem. The problem is the result of the smooth surface of the drawn metallic conductor which does not adhere to the PVC jacket as well as the rough surface of the earlier manufactured electroformed conductor. This problem has been solved by applying electrostatically an adhesive to preheated conductors prior to the extrusion of the jacket material, but this solution involves an additional step.

The presently used aerial service wire presents some other problems. It is relatively stiff and somewhat difficult to handle. Stripping for termination requires separation of the insulated conductors with diagonal pliers, crushing of the insulation in rear jaws of the pliers, and removal of the insulation and adhesive residues by a stripper notch of the pliers. Also, the wire cannot be terminated in insulation displacement type connectors because of the relatively thick PVC insulation which toughens as temperature decreases and because copper-steel conductors are not easily and reliably accommodated by these kinds of connectors. Further cost reductions of the design are difficult to achieve inasmuch as the PVC material serves as both the jacket and conductor insulation, thereby requiring a balancing of mechanical and electrical requirements.

A most important reason for seeking a new design is the corrosion of the bimetallic conductor which occurs in coastal and industrial areas. Corrosion appears where a conductor has been stripped for termination, where a conductor has been accidentally nicked during separation of the conductors by pliers, or where maintenance tests have been made improperly by inserting test pins through insulation to a conductor.

What is needed and what is not provided by the prior art is an aerial service transmission medium which provides adequate protection against corrosion and which at least meets the strength properties of the prior art copper-clad steel design. The strength members of the sought-after aerial service transmission medium must have suitable coupling to the jacket in order to make it compatible with present support schemes at customers' premises. Further, it is a desire to have the conductors insulated with a material other than that used for the jacket in order to access the conductors without causing damage and to separate the electrical requirements of insulation from the mechanical requirements of the jacket. Still further, the design should be one which easily may be adaptable to optical fiber loop transmission.

SUMMARY OF THE INVENTION

The foregoing problems have been overcome by the communications transmission media of this invention. A communications transmission medium includes two conductors which are covered individually with a plastic material. A jacket which comprises a plastic material encloses the conductors with the conductors being adjacent to each other and to a longitudinal axis of the jacket. The longitudinal axis passes through a geometric center of each transverse cross section of the jacket. The transmission medium also includes two non-metallic support strands or strength members each of which includes a plurality of filaments that are assembled together and each of which is impregnated with a plastic material which is compatible with that of the jacket. Each of the strength members is disposed between the conductors and an outer surface of the jacket such that the strength members and the longitudinal axis which is interposed therebetween are aligned. Each strength member passes through each cross section of the jacket along an axis which spans the cross section and which extends through the geometric center thereof.

For a one pair metallic conductor service wire, two insulated copper conductors are spaced apart by a relatively thin web of the jacket material and generally are disposed along an axis which is transverse to the axis along which the strength members are situated. For a two pair, quad wire, the conductors are disposed in a circle about the geometric center of each jacket cross section with conductors of one pair being interposed among conductors of the other pair.

It should be readily apparent that an aerial service transmission medium of this invention may include optical fiber conductors as well as metallic conductors. For an optical fiber aerial service cable, at least one optical fiber is enclosed in a core wrap and disposed about the geometric center of the jacket with a center of the fibers being disposed along the axis along which the strength members are disposed.

Advantageously, an aerial service transmission medium of this invention provides suitable coupling of roving or yarn type strength members to the jacket which avoids prior art schemes of using an intermediate adhesive material or preheating of the conductors which also serve as strength members. Also, because of the geometry, support clamps at a customer's premises and at a pole bear on outer portions of the jacket cross section over the strength members instead of over the conductors.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
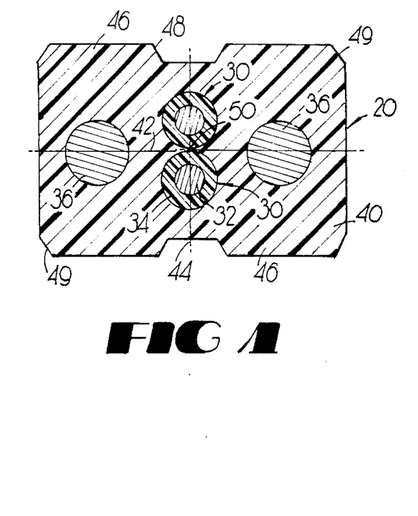
FIG. 1 is an end cross-sectional view of an aerial service wire of this invention.
Figure 2:
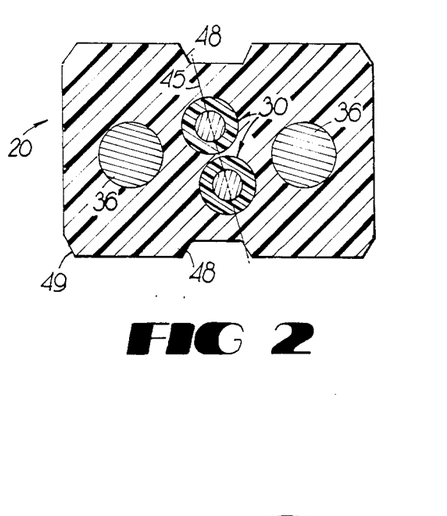
FIG. 2 is another end cross-sectional view of the aerial service wire of FIG. 1.

Referring now to FIGS. 1 and 2, there is shown a communications transmission medium of this invention and more particularly an aerial service transmission medium 20. The aerial service transmission medium 20 is used to bring service from overhead aerial distribution cables 22—22 (see FIG. 3) which are strung between poles 24—24 to customer's premises. One end of the aerial service transmission medium is supported from a wedge-shaped clamp 26 (see FIG. 4) attached to a pole 24 and connected to the cable 22. The other end is supported from a similar clamp attached to a customer's home. An electrical connection is made to conductors which extend inside the premises to telephone handsets or other communications equipment.

In the particular embodiment shown in FIG. 1, the aerial service transmission medium 20 is an aerial service wire which is often termed a drop wire. Referring again to FIG. 1, it is seen that the aerial service wire 20 includes two insulated conductors 30—30, which in a preferred embodiment are not twisted together. Each of the insulated conductors 30—30 in FIG. 1 includes a metallic conductor 32, which is made of a material such as copper, for example, and is provided with individual insulation in the form of a cover 34. In the preferred embodiment of FIG. 1, the insulation is a polyolefin material such as polyethylene.

The aerial service wire 20 also includes a pair of strength members or support strands 36—36 which extend longitudinally. Each of the strength members 36—36 in the preferred embodiment of FIG. 1 comprises a fibrous strand material which is impregnated with a plastic material. Each strength member 36 comprises a plurality of filaments which are gathered together. The filaments may be a material such as a fiberglass or an organic material such as KEVLAR ® aramid fiber. Further, the filaments may be assembled together so that they extend generally parallel to the longitudinal axis of the strength member in which case they comprise a roving or twisted together to form a yarn. In a preferred embodiment, the members 36—36 which provide strength for the aerial service wire 20 each are comprised of a plurality of E-glass fibers. E-glass fibers comprise a borosilicate composition with the fibers having a minimum tensile strength of 200,000 psi. In a preferred embodiment, each strength member comprises about 8000 fibers.

As can be seen in FIG. 1, the insulated conductors 30—30 and the strength members 36—36 are enclosed in a jacket 40 comprising a plastic material which in a preferred embodiment is polyvinyl chloride (PVC). The jacket 40 is generally rectangular in cross section and includes a first or neutral axis 42 which extends horizontally in FIG. 1 and a second axis 44 which is normal thereto. The jacket cross section has a width as measured in a direction parallel to the first axis 42 and a height as measured in a direction parallel to the second axis 44. Further, the jacket 40 is provided with enlarged end portions 46—46 at opposite ends of the axis 42. The enlarged portions 46—46 create troughs 48—48 which extend longitudinally of the wire. Also, the corners of the jacket are provided with chamfers 49—49.

The arrangement of the insulated conductors 30—30 and of the strength members 36—36 within the jacket 40 is important. As is seen in FIG. 1, the conductors 30—30 are generally disposed adjacent to a longitudinal axis 50 of the jacket which passes through a geometric center of each jacket cross section through which the first axis 42 also passes. The orientation of the conductors 30—30 may vary with respect to the axis 44 along the length of the aerial service wire 20. For example, the conductors 30—30 may be disposed along the second axis 44 which is substantially normal to the axis 42 as shown or may be disposed along an axis 45 which is inclined instead of normal to the axis 42 (see FIG. 2), or may be disposed along the axis 42.

Generally, in a one pair aerial service wire, the insulated conductors are spaced apart slightly. This is done for two reasons. First, the spacing is required in order to achieve a predetermined mutual capacitance for the conductor pair. Secondly, it is done in order to avoid bonding between the two insulated conductors, particularly during the application of a molten plastic material to form the jacket 40.

Also of importance is the disposition of the strength members 36—36 with respect to the conductors 30—30 and the jacket 40. As shown, they are disposed along the axis 42 and outboard of the conductors 30—30. Each strength member 36 is disposed along the axis 42 between the conductors 30—30 and the outer surface of the jacket. Because the strength members and the longitudinal axis intersect the axis 42 of each jacket cross section, the strength members and the longitudinal axis which is interposed therebetween are aligned. Further, each strength member 36 is disposed within one of the enlarged end portions 46—46, which are referred to as support columns. As a result, the compressive forces provided by a clamp 26 are aligned with the support columns 46—46 and the strength members 36—36 therein. Conductors are protected against compressive loading of the support clamp by the troughs 48—48.

Figures 3, 4:
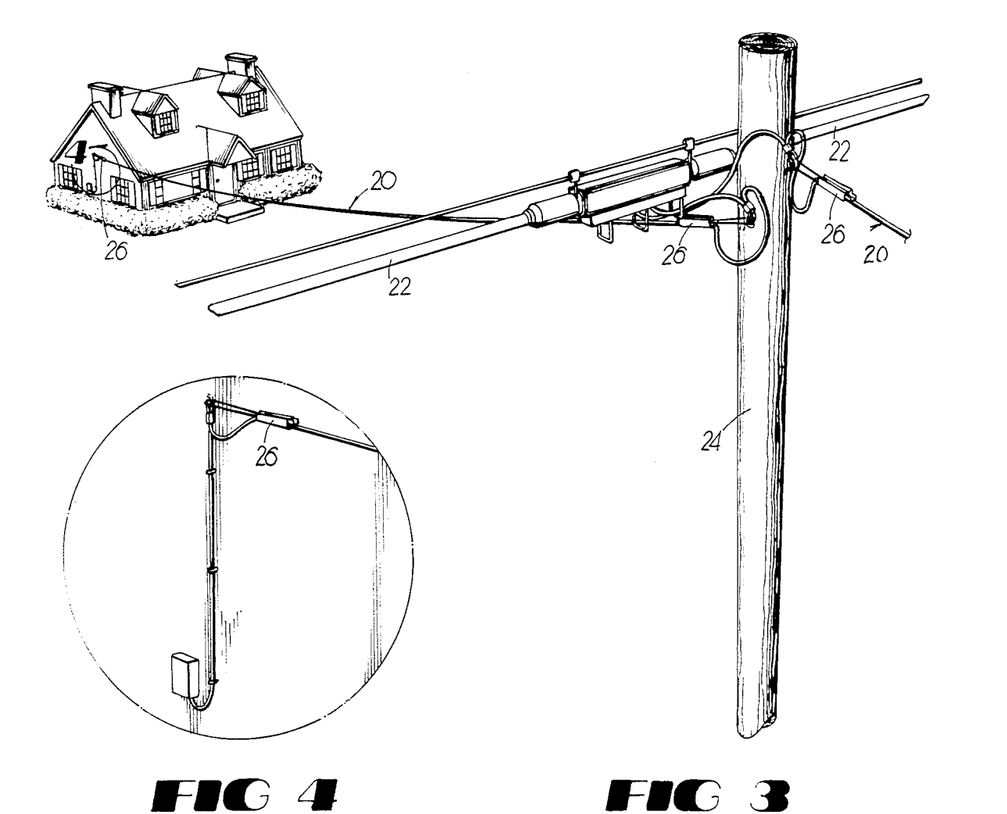
FIG. 3 is a perspective view showing an installation of aerial service wire.
FIG. 4 is a detail view of a portion of the installation of FIG. 3.

The aerial service wire 20 forms generally a catenary between the two wedge-shaped clamps (see FIG. 3). The load due to the weight of the length of the aerial service wire in the catenary causes forces to be exerted between the clamps 26—26 and the ends of the aerial service wire. Each clamp 26 engages the outer surface of the jacket 40. It should be apparent that if there is insufficient adhesion between the jacket 40 and the strength members 36—36, the reaction of the clamp on the aerial service wire due to combined effects of wire weight and any ice and wind loading could cause the jacketing material to be pulled therefrom leaving the insulated conductors unprotected and perhaps causing the wire to fall. It follows that the jacketing composition must have at least a sufficient minimum adhesion to the strength members 36—36. At the same time, the adhesion between the jacketing composition and the insulated conductors 30—30 should be a minimum and preferably zero to allow slippage between the conductors and the jacket 40 when flexed during installation and use.

Not only must the strength members 36—36 be suitably adhered to the jacket 40, they must also have suitable strength characteristics to prevent static load failure. Static load failure is caused by filament abrasion, flaws and tensile load imbalance. Filaments are abraded by neighboring filaments in the support member and by particles in the jacket 40 and is most severe under the clamps 26—26. Flaws occur with a probability that increases with the filament length and cause static load failures in a length of time which is approximately inversely proportional to the wire length. Uneven sharing of the tensile load results when the filaments are not coupled to share tensile loads evenly. As some filaments break, others accept the load until the total cross section of the strength member fails.

Generally, as a solution to these problems, impregnated rovings or yarns are used as strength members. The material which is used to impregnate the strength members must be such that the strength members are coupled to the jacket sufficiently so that there is no rupture, nor slippage nor any degradation of dielectric strength after a 290 pound tensile load has been applied to the aerial service transmission medium through support clamps for a 24 hour period at room temperature. The material used to impregnate the strength members must be a material that will couple to the jacket 40. Also, it must exhibit a relatively high coefficient of static friction with the material of the jacket 40. Further it must have hydrolytic stability. The impregnating material may be formed either by condensation or addition polymerization reactions and may include, for example, urethanes, acrylic acid or acrylate-based materials, epoxies, polyesters, and polyvinyl chloride or other vinyl based materials. For strength member materials such as fiberglass, a coupling agent or sizing such as silane must be used to couple the impregnating material to the filaments; for materials such as KEVLAR ® fiber, a coupling agent may not be required.

In a preferred embodiment, vinyl compatible, impregnated fiberglass rovings or yarns are used as strength members. The impregnating material coats each filament with a layer which protects against abrasion, and couples each filament to its neighbor to bridge flaws and establish tensile load balance.

Fiberglass impregnation is customarily accomplished by fiberglass suppliers. Glass filaments are drawn from a furnace bushing and cooled by a water spray followed by the application of a water dispersion of silane. Drying removes excess water and alcohol, which is formed as the silane bonds to glass, and leaves a silane-coated filament with organo functional groups positioned to couple with a vinyl compatible impregnating material. Each strength member is impregnated in a bath with the sized fibers being spaced apart to enhance the impregnation. For an example of a method of impregnating a bundle of filaments, see U.S. Pat. No. 4,479,984 which issued on Oct. 30, 1984 in the names of N. Levy and P. D. Patel and which is incorporated by reference hereinto.

Impregnated roving or yarn overcomes a disadvantage of plain roving or yarn for the strength members 36—36. Unlike plain roving or yarn, any flaws in any of the filaments are bridged by the impregnating material which also prevents abrasion. There is sufficient adhesion of the jacket 40 to the strength members 36—36 to allow suitable transfer of forces to the strength members from the clamps 26—26. Impregnation increases the flex life of the completed structure over that of the copperclad steel conductor design by a factor of about two. Further, the flex life of an aerial service wire which includes impregnated strength members is, at expected maximum surface temperatures, about ten times that of one which includes strength members that are not impregnated.

The aerial service wire 20 provides other advantages. It has a flame-retardant jacket. Conductors are positioned for protection against impact and abrasion. Another advantage relates to handling criteria. The unprotected hands of a craftsperson preparing the wire for termination are not exposed to the filaments as the jacket is removed to access the conductors.

Figure 5:
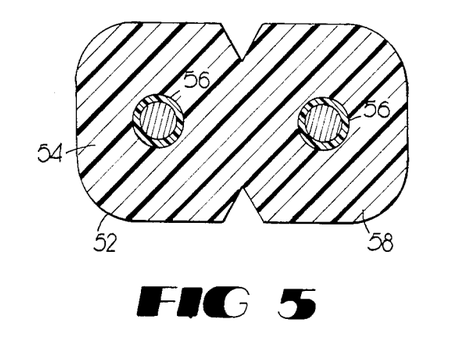
FIGS. 5 and 6 show prior art aerial service wires.

The use of individually insulated conductors 30—30 avoids problems with a prior art aerial service wire 52 (see FIG. 5) wherein a single plastic material 54 was used to provide insulation for copper-clad steel conductors 56—56 and a jacket 58. The plastic material had to be tough, have adequate low temperature flexibility, acceptable resistance to compression, ultra-violet resistance, acceptable weatherability, adequate flame-retardance because of the installation adjacent to customer's premises and high insulation resistance to insulate the conductors. Inasmuch as each function, insulating and jacketing, was required to provide particular properties, compromises were made to accommodate both functions with a single material. In the aerial service wire 20, the polyolefin material is an insulation for the conductors and the polyvinyl chloride an excellent jacketing material. Furthermore, the polyolefin does not bond to the polyvinyl chloride and thereby allows slippage between the conductors and the jacket. In addition, the polyolefin insulation has a lower dielectric constant than polyvinyl chloride, allowing an acceptable mutual capacitance to be achieved with a closer spacing of conductors.

Figure 6:
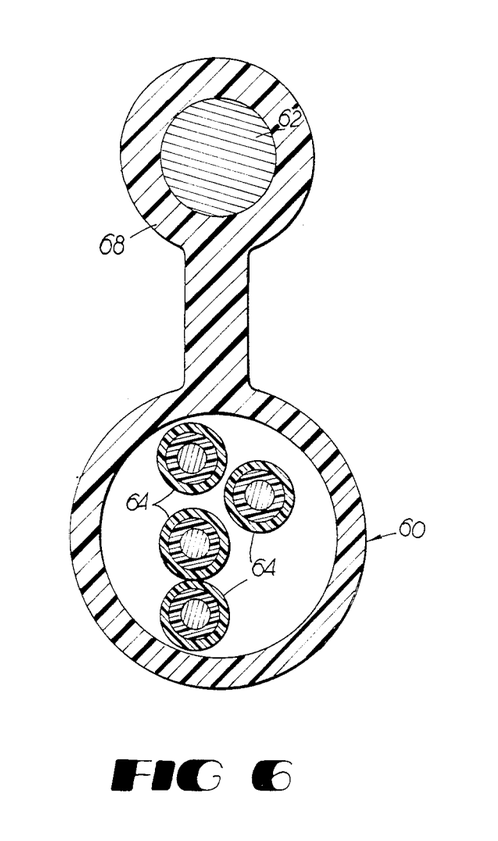

The aerial service wire 20 is easier to manufacture than a presently available multiple drop wire 60 (see FIG. 6). That wire includes a steel support strand 62 in one loop of a figure eight cross section and a plurality of pairs of individually insulated conductors 64—64 in the other. Each conductor of each pair is insulated with polyethylene and a PVC skin. The conductors 64—64 and the steel support strand 62 are enclosed in a common PVC jacket 68.

Another advantage of the aerial service transmission medium 20 of this invention relates to adhesion considerations. It will be recalled that the prior art drop wire includes bimetallic elongated members which double as conductors and as strength members. The excessive adhesion to the elongated member required for the strength function renders the drop wire extremely difficult to strip during an interconnection operation. In overcoming the adhesion to remove the insulation, the craftsperson could nick the conductors. This may affect adversely the electrical properties of the conductors as well as penetrate the copper cladding thereby exposing the steel core to possible corrosion. Hence, there is a critical upper, as well as a critical lower, limit of adhesion values for the prior art drop wire. Advantageously, in the aerial service wire of this invention, the conductors and the non-metallic strength members are separate entities. As a result, the relatively low and high values of adhesion of the jacket 40 for each need not be compromised to achieve a middle ground.

Figure 7:
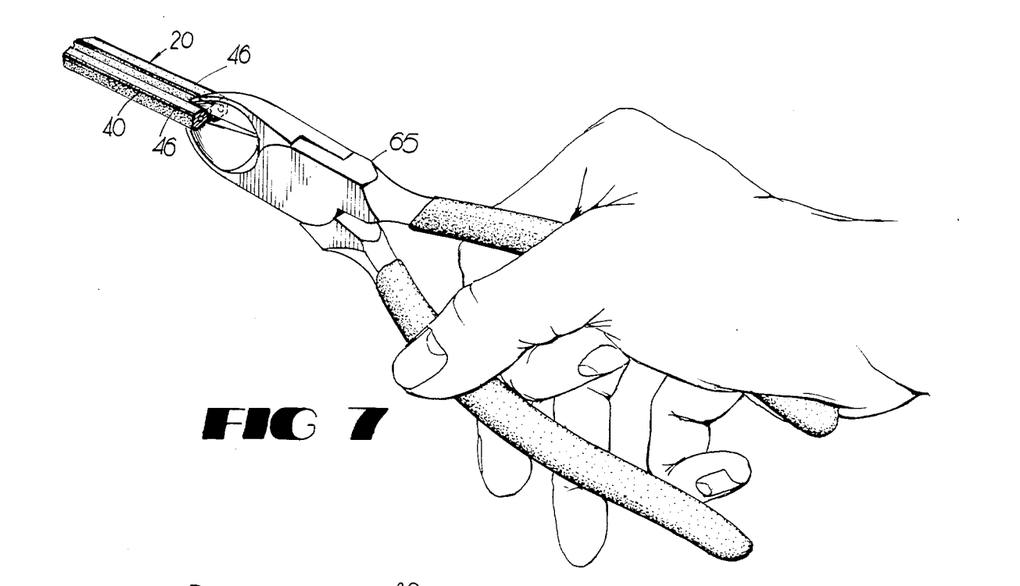
FIG. 7 and 8 show the stripping of an aerial service wire of this invention.
Figure 8:
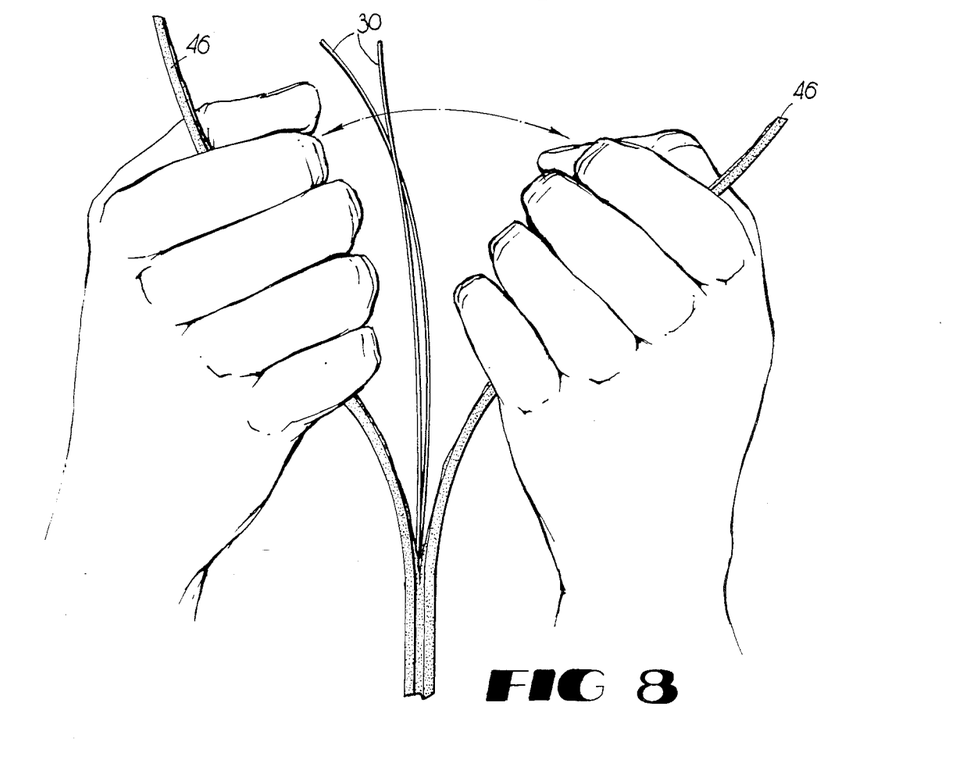

Conductors of the aerial service wire 20 may be accessed by a "split" method at normal temperatures or a "clip-twist" method at relatively low temperatures such as those in the range of −20° to 30° F. In the split method, a craftsperson makes a cut with diagonal pliers 65 into the jacket 40 between the support columns 46—46 (see FIG. 7). Then the craftsperson grasps a support column 46 in each hand and applies forces to separate one support column from the other (see FIG. 8). As is seen in FIG. 8, this is effective to separate out the insulated conductors 30—30.

Figures 9, 12:
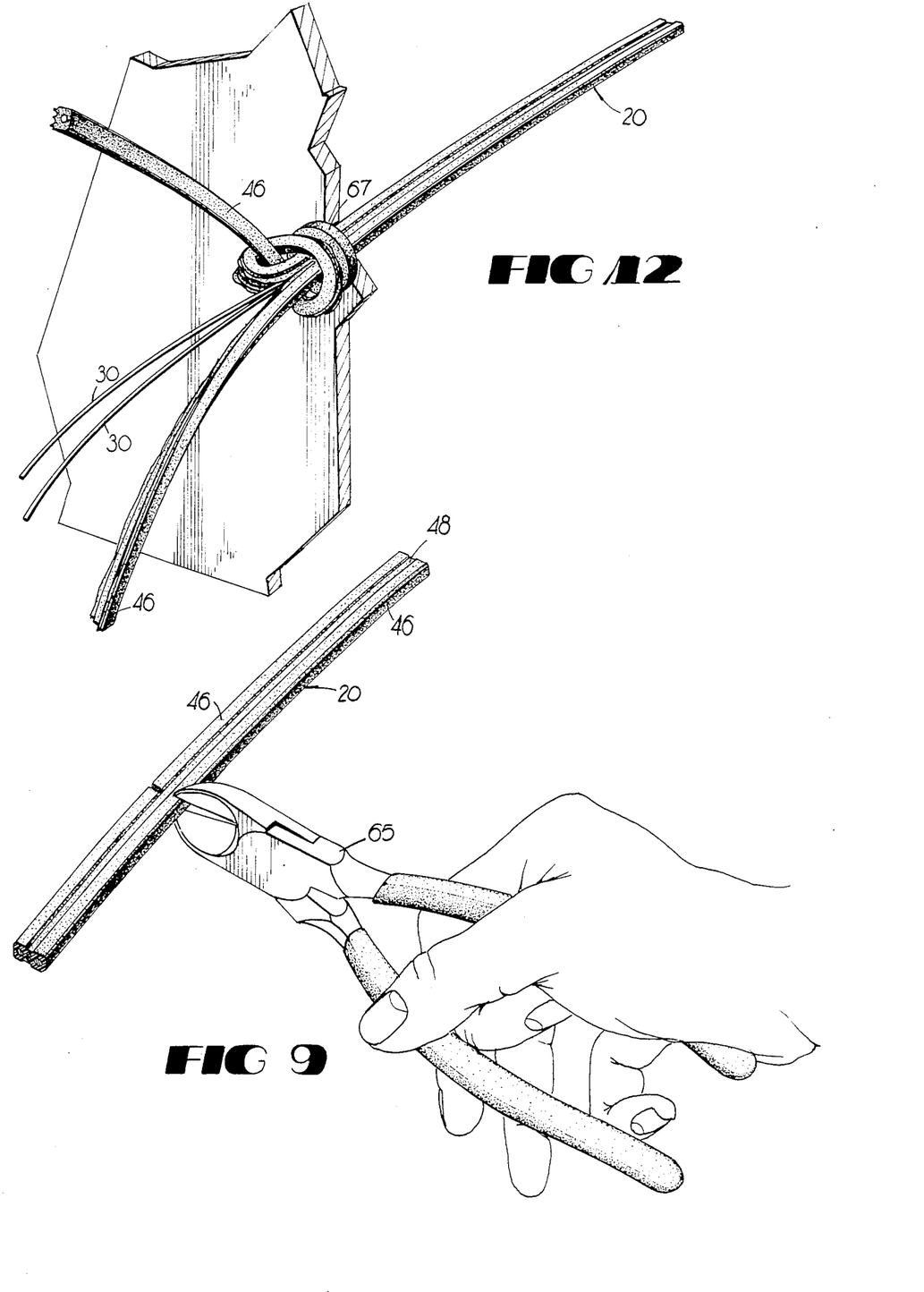
FIGS. 9-11 show a sequence of steps for stripping an aerial service wire of this invention at low temperatures.
FIG. 12 shows the knotting of the aerial service wire adjacent to a wall of a closure to provide strain relief.
Figure 10:
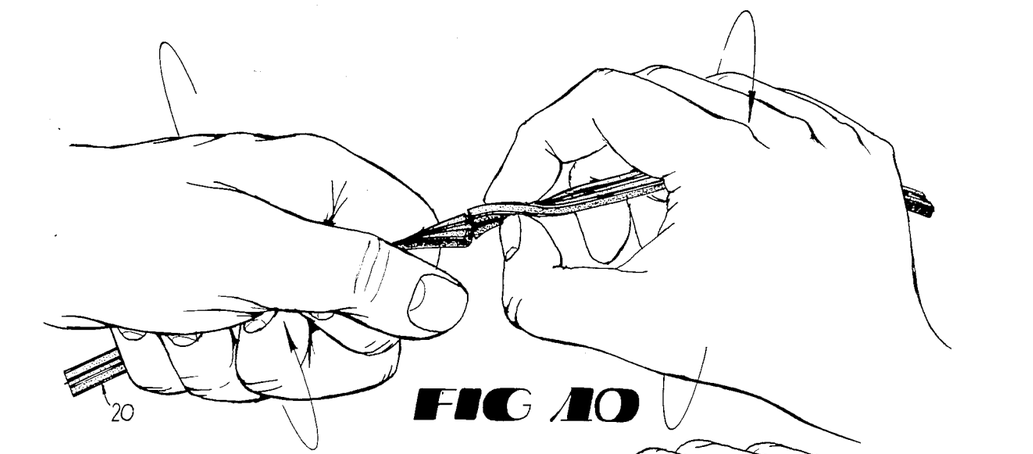
Figures 11, 13:
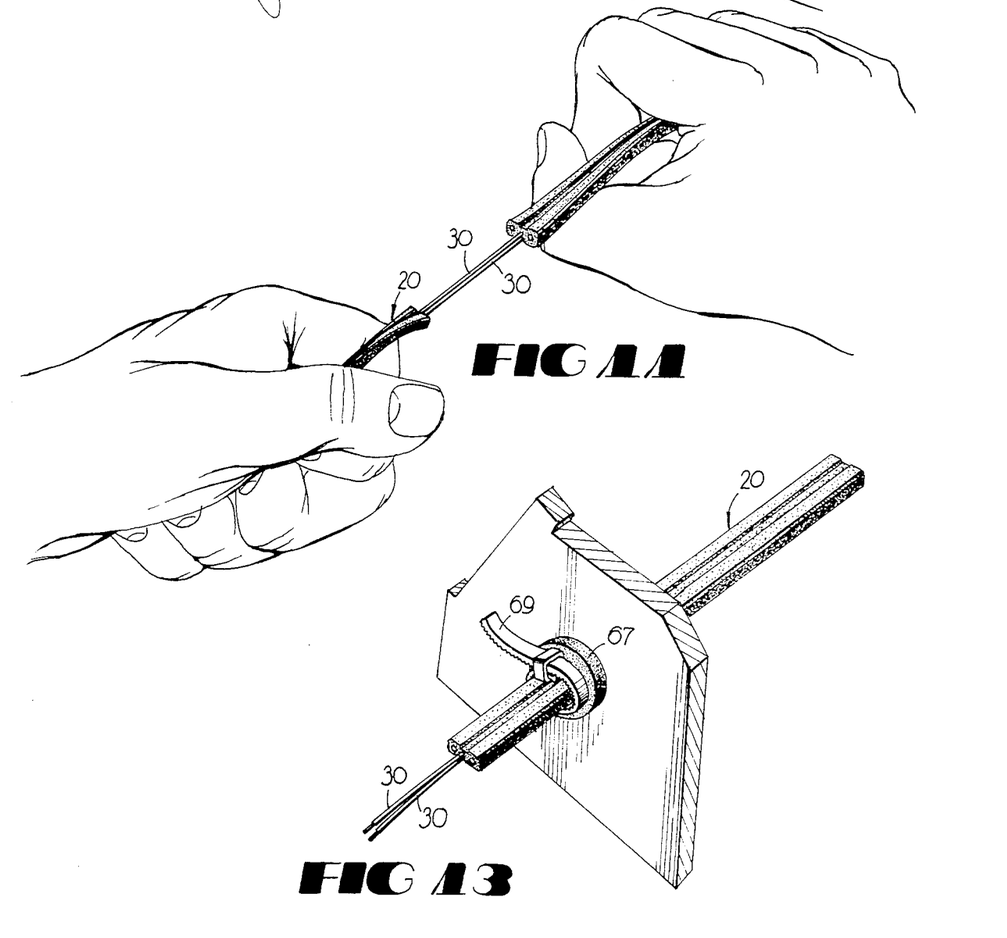
FIG. 13 shows the use of a cable tie adjacent to the wall of a closure.

In the clip-twist method, the craftsperson uses the pliers 65 to cut the jacket from each of its sides (see FIG. 9) to the troughs 48—48 which are centered over the conductors. Then the craftsperson twists the wire (see FIG. 10) to break any connection to the center portion of the jacket and pulls the separated jacket portions apart leaving the insulated conductor portions (see FIG. 11).

Strain relief at a closure is provided by knotting the support columns 46—46 or the complete aerial service wire just inside a wire entrance grommet 67 (see FIG. 12) of a closure wall. In the alternative, a cable tie 69 is used on a section including the support columns just inside a wire entrance grommet 67 (see FIG. 13).

Figure 14:
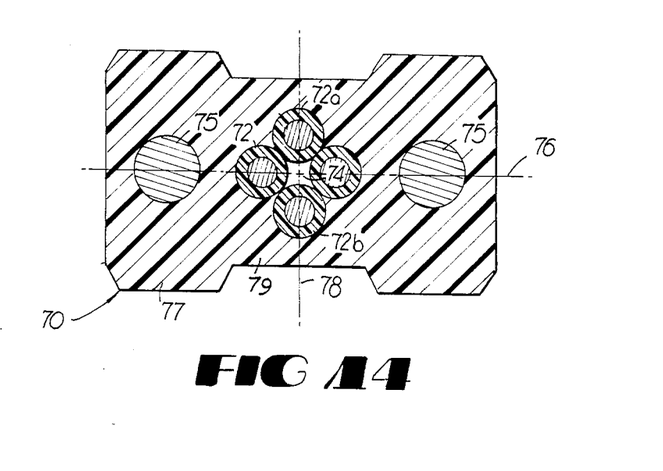
FIGS. 14 and 15 are end cross-sectional views of an aerial service quad wire.
Figure 15:
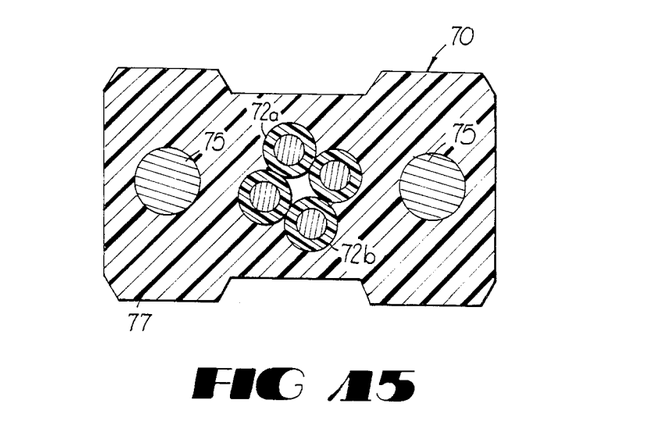

It should be readily apparent that the configuration of the aerial service wire 20 may be used to accommodate a quad, for example, of insulated conductors instead of a pair. As can be seen in FIG. 14, the configuration of a quad wire 70 is substantially the same as that for the single pair wire. The quad wire 70 comprises two pairs of individually insulated conductors 72—72, the conductors of each pair being diagonally opposite to each other. The conductors of the pair are disposed about a center 74 which is disposed along a centerline axis 76 of the cross section of the aerial service wire. Strength members 75—75 are disposed along the axis 76 within support columns 77—77 of a jacket 79. In FIG. 14, one pair of conductors, designated 72a and 72b, are disposed along an axis 78 which is perpendicular to the axis 76 which extends through the strength members 75—75. Of course, this orientation of the conductors in the quad cross section is not necessary. In fact, along the length of the aerial service wire 70, the conductors may be rotated or oscillated through positions shown in FIG. 14 and FIG. 15 to improve wire flexibility.

The quad, shown in FIG. 14 as well as the single pair metallic conductor aerial service wire, is compatible with the industry standard drop wire clamp. Also, one pair wire is 14% lighter than that of U.S. Pat. No. 3,935,369; two pair wire is 46% lighter than the two pair multiple drop wire. Not only is the cost of the aerial service wire of this invention less than the presently made product, but overall transmission properties are improved over presently used drop wire. For example, a lower DC resistance is achieved by solid copper conductors. Also, a lower mutual capacitance results from the use of polyethylene insulation and the wire geometry.

Figure 16:
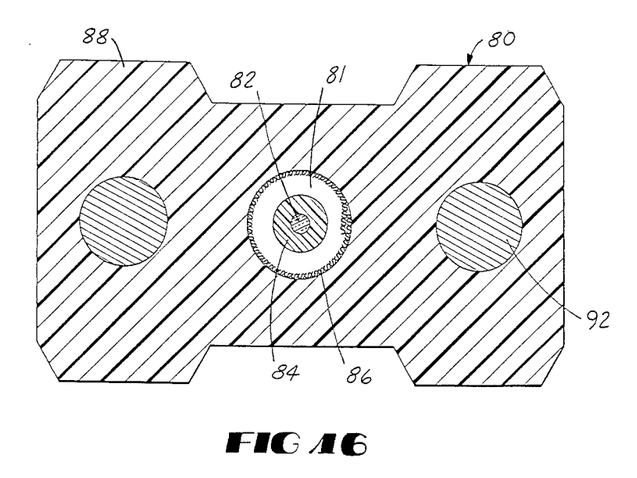
FIGS. 16 and 17 are end cross-sectional views of optical fiber aerial service transmission media of this invention.

Another embodiment of an aerial service transmission medium of this invention is designated by the numeral 80 and includes at least one optical fiber conductor as shown in FIG. 16. In it, the transmission portions of a core 81 includes at least one optical fiber 82 which is provided with a buffer covering 84. The buffer covering 84 typically comprises PVC. The core 81 is enclosed with an impregnated glass tape 86 to prevent a jacket 88, which in a preferred embodiment is made of PVC, from bonding to the buffer coverings of the optical fiber. The tape also prevents the heat of extrusion from melting the PVC buffer covering 84 and provides a containment for any filling material. Also, the aerial service transmission medium 80 includes strength members 92—92 which are disposed similar to the strength members 36—36 in FIG. 1. The optical fiber is undulated in the core wrap so that the maximum tensile load on the aerial service optical fiber structure will not strain the optical fiber to cause damage and so that microbending losses are minimized.

Figure 17:
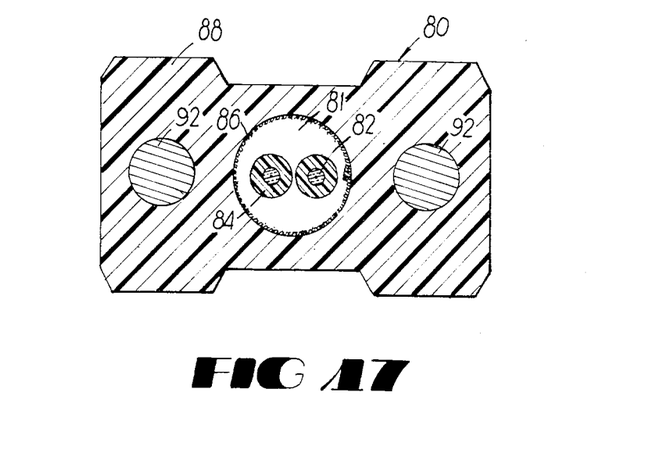

Although the cable shown in FIG. 16 includes only one optical fiber, it is within the scope of this invention to include more than one optical fiber in the core 81. For example, there is shown in FIG. 17, an aerial service transmission medium 80 which inclues two optical fibers.

It should be clear that both metallic conductors and optical fibers may be included in communications transmission media of this invention. Further, it should be clear that the communications transmission media of this invention may be used for aerial or for buried installations.

It is to be understood that the above-described arrangements are simply illustrative of the invention. Other arrangements may be devised by those skilled in the art which will embody the principles of the invention and fall within the spirit and scope thereof.

What is claimed is:

1. A communications transmission medium, which comprises:
    at least one conductor which is enclosed with a plastic material;
    a jacket which comprises a plastic material and which encloses but does not bond to the plastic material which encloses said at least one conductor, said at least one conductor being adjacent to a longitudinal axis of the jacket which passes through a geometric center of each cross section of the jacket which is transverse to the longitudinal axis, and wherein each cross section is defined by a width and a height with an axis which spans each jacket cross section extending along said width and through the geometric center of the cross section, the height of end portions of the cross section being greater than the height of a center portion which connects the end portions to provide a longitudinally extending trough in said jacket which upon the application of cutting forces thereto facilitates the accessing of the conductor which becomes separated from the jacket because of the non-affinity of plastic material which encloses the conductor and of the plastic material comprising the jacket; and
    two non-metallic strength members each of which comprises a plurality of filaments that are gathered together and each of which is impregnated with a plastic material that causes it to be coupled to said jacket, each of said strength members being disposed between the at least one conductor and an outer surface of said jacket and aligned with one of said end portions of said jacket such that the strength members and the longitudinal axis which is interposed therebetween are aligned and wherein each strength member passes through each cross section along the axis which spans the cross section.

2. The communications transmission medium of claim 1, wherein the width is greater than the height of the cross section of the jacket.

3. The communications transmission medium of claim 1, wherein said at least one conductor is an optical fiber.

4. The communications transmission medium of claim 1, wherein said at least one conductor comprises two optical fibers, each of the fibers having a buffer covering and the fibers being disposed loosely in a tube comprising an impregnated glass tape.

5. The communications transmission medium of claim 3, wherein each strength member comprises filaments which are substantially parallel to the longitudinal axis.

6. The communications transmission medium of claim 1, wherein said at least one conductor is an individually insulated metallic conductor.

7. The communications transmission medium of claim 6, which comprises two insulated metallic conductors which are spaced slightly apart.

8. The communications transmission medium of claim 6, wherein each of said conductors is insulated with a polyolefin material.

9. The communications transmission medium of claim 6, wherein said insulated conductors are contiguous to each other.

10. The communications transmission medium of claim 9, wherein the axis along which the strength members are disposed is a first axis and wherein said communications medium comprises four conductors comprising two pairs with the conductors being adjacent to one another and disposed in a group having a center which is substantially coincident with the geometric center of the jacket cross section and with two of the conductors being disposed along a second axis which is transverse to the first.

11. The communications transmission medium of claim 7, wherein each of said conductors is insulated with a first plastic material and said jacket comprises a second plastic material.

12. The communications transmission medium of claim 11, wherein said first plastic material is a polyolefin material and said second plastic material is a polyvinyl chloride composition of matter.

13. The communications transmission medium of claim 7, wherein each strength member comprises filaments which are stranded together.

14. An aerial service wire, which comprises:
    at least two metallic conductors which are individually insulated with a plastic material;
    two strength members each of which comprises glass filaments which are coupled to each other with the filaments being coated with and the interstices among the filaments of each being filled with a vinyl compatible material; and
    a jacket which comprises a polyvinyl chloride plastic material and which encloses said conductors and said strength members without bonding to the plastic material which insulates said conductors, said jacket having a cross section in which an overall height thereof is less than an overall width thereof, said conductors being adjacent to each other and to a geometric center of the jacket cross section and each of said strength members being disposed between said conductors and an outer surface of said jacket and along an axis which extends along the width of the jacket cross section, the jacket cross section having a reduced height along a center portion thereof which is aligned with said conductors to provide a longitudinally extending trough in said jacket which upon the application of cutting forces thereto facilitates the accessing of the insulated conductors which become separated from the jacket because of the non-affinity of plastic material which insulates the conductors and of the plastic material comprising the jacket.

* * * * *